US012573806B2

(12) United States Patent
Vetrovec

(10) Patent No.: US 12,573,806 B2
(45) Date of Patent: Mar. 10, 2026

(54) BLUE LASER OPERATING AT THE H-BETA FRAUNHOFER LINE

(71) Applicant: Jan Vetrovec, Larkspur, CO (US)

(72) Inventor: Jan Vetrovec, Larkspur, CO (US)

(73) Assignee: Agwest LLC, Larkspur, CO (US)

( * ) Notice: Subject to any disclaimer, the term of this patent is extended or adjusted under 35 U.S.C. 154(b) by 748 days.

(21) Appl. No.: 17/886,290

(22) Filed: Aug. 11, 2022

(65) Prior Publication Data

US 2023/0048286 A1 Feb. 16, 2023

Related U.S. Application Data

(60) Provisional application No. 63/259,787, filed on Aug. 11, 2021.

(51) Int. Cl.
*H01S 3/00* (2006.01)
*G02F 1/35* (2006.01)
(Continued)

(52) U.S. Cl.
CPC ............ *H01S 3/1123* (2023.01); *G02F 1/354* (2021.01); *H01S 3/0092* (2013.01);
(Continued)

(58) Field of Classification Search
CPC ......... H01S 3/1616; H01S 3/1123–127; H01S 3/08009; H01S 3/0092; H01S 3/109
See application file for complete search history.

(56) References Cited

U.S. PATENT DOCUMENTS 4,949,348 A * 8/1990 Nguyen .................. H01S 3/094
                                                            372/41
5,163,061 A * 11/1992 Moberg .................. H01S 3/305
                                                            372/98
(Continued)

FOREIGN PATENT DOCUMENTS

| CN | 103311782 B | * | 12/2015 |
| CN | 111041557 A | * | 4/2020 |
| CN | 114204396 A | * | 3/2022 |

OTHER PUBLICATIONS

Eremeev (Broadband emitting materials doped with thulium and holmium ions for solid-state lasers at 2 µm and beyond.â Materials Science [cond-mat.mtrl-sci]. Normandie UniversitÃ ©, 2024. English. ffNNT : 2024NORMC232) (Year: 2024).*

(Continued)

*Primary Examiner* — Tod T Van Roy
(74) *Attorney, Agent, or Firm* — Compass Rosa Law; Christopher Villani

(57) ABSTRACT

The present invention provides a blue laser transmitter operating at the H-beta Fraunhofer line at 486.13 nm wavelength. The subject blue laser is based on pulsed lasing action in thulium doped into lutetium sesquioxide (Tm: $Lu_2O_3$). The laser wavelength is restricted by volume Bragg grating to the vicinity of 1944 nm wavelength. The laser is operated with a q-switch to generate high-energy pulses within the nanosecond regime. The output at the 1944 nm wavelength is then frequency quadrupled in a single pass through non-linear crystals to a wavelength near the center of the H-beta Fraunhofer line. The operation at the 1944 nm wavelength in $Tm:Lu_2O_3$ is very efficient because this wavelength is located on a shoulder of a substantially broad emission peak at 1945 nm. In addition, at the 1944 nm wavelength, $Tm:Lu_2O_3$ has only a modest saturation fluence (Continued)

*Figure showing Blue Laser Assembly 100, with labels: Surface 182, Polarizer 116, Intracavity Laser Beam at 1944 nm 120, ¼ Wave Plate 122, Output Laser Beam at 1944 nm 140, Laser Source 150, Pump Light 130, Tm:Lu2O3 LGM 114, Laser Oscillator 172, Pump Module 110, Q-Switch 118, VBG Mirror 126, TEC 124, Power Amplifier (optional) 128, Pump 168, Dichroic End Mirror 112, Output Laser Beam at 1944 nm 140, FQS 160, First Harmonic Converter Stage 162, Second Harmonic Converter Stage 164, TO APPLICATION, First Harmonic Beam at 972 nm 166, Second Harmonic Beam at 486 nm 170.* of about 15 J/cm², which allows for efficient energy extraction.

15 Claims, 8 Drawing Sheets

(51) Int. Cl.

| | |
|---|---|
| *H01S 3/04* | (2006.01) |
| *H01S 3/08* | (2023.01) |
| *H01S 3/094* | (2006.01) |
| *H01S 3/1123* | (2023.01) |
| *H01S 3/137* | (2006.01) |
| *H01S 3/16* | (2006.01) |
| *H01S 3/23* | (2006.01) |

(52) U.S. Cl.
CPC ........ *H01S 3/0401* (2013.01); *H01S 3/08009* (2013.01); *H01S 3/094038* (2013.01); *H01S 3/137* (2013.01); *H01S 3/1616* (2013.01); *H01S 3/163* (2013.01); *H01S 3/1685* (2013.01); *H01S 3/0405* (2013.01); *H01S 3/2308* (2013.01); *H01S 2302/00* (2013.01); *H01S 2303/00* (2013.01)

(56) References Cited

U.S. PATENT DOCUMENTS

| | | | | |
|---|---|---|---|---|
| 5,216,681 | A * | 6/1993 | St. Pierre | H01S 3/16 372/18 |
| 8,817,827 | B2 * | 8/2014 | Ter-Mikirtychev | H01S 3/06758 372/5 |
| 8,953,647 | B1 * | 2/2015 | Mead | H01S 3/1616 372/6 |
| 9,112,328 | B2 * | 8/2015 | Traynor | H01S 3/06754 |
| 9,684,077 | B2 * | 6/2017 | Mead | H04B 10/808 |
| 11,791,602 | B2 * | 10/2023 | Noach | H01S 3/1062 372/11 |
| 2023/0048286 | A1 * | 2/2023 | Vetrovec | G02F 1/354 |
| 2023/0052245 | A1 * | 2/2023 | Wang | H01S 3/1616 |

OTHER PUBLICATIONS

Hanson et al. (Feasibility of a 486 Fraunhofer laser source based on a 4F3/2 to 4I9/2 Neodymium laserâ; Naval Technical report 1480, Mar. 1992) (Year: 1992).*

McMillen et al. (Hydrothermal single-crystal growth of Lu2O3 and Lanthanide-doped Lu2O3â; Cryst. Growth Des., 11, 4386-4391, 2011) (Year: 2011).*

Stevenson ("Diode pumped Tm3+ doped sesquioxide lasers for ultrashort pulse applications in the 2um region"; https://doi.org/10.17630/10023-19629, Jun. 2020) (Year: 2020).*

Vetrovec et al. ("Wide-bandwidth ceramic Tm:Lu2O3 amplifier"; Proc. of SPIE, vol. 9834, 2016) (Year: 2016).*

* cited by examiner

LIGHT ATTENUATION COEFFICIENT OF JERLOV OCEANIC WATER TYPES I TO III VS. WAVELENGTH

BLUE LASER OPERATING AT THE H-BETA FRAUNHOFER LINE

CROSS-REFERENCE TO RELATED APPLICATIONS

This patent application claims priority from U.S. provisional patent application U.S. Ser. No. 63/259,787, filed on Aug. 11, 2021 and entitled "Blue Laser Operating at the H-Beta Fraunhofer Line" the entire contents of all of which are hereby expressly incorporated by reference.

GOVERNMENT RIGHTS IN THIS INVENTION

This invention was reduced to laboratory practice with U.S. Government support under the U.S. Navy contract no. N68335-19-C-0491. The U.S. Government may have certain rights in this invention.

FIELD OF THE INVENTION

This invention relates generally to blue lasers and more specifically to pulsed blue lasers generating coherent radiation with wavelength at the H-beta Fraunhofer line.

BACKGROUND OF THE INVENTION

There is a strong need for a high peak-power blue laser system for remote detection of underwater objects and bathymetry in bodies of water including rivers, lakes, reservoirs, seas, and oceans. In these applications, the instrument may comprise a blue laser transmitter and a detector, such as shown in FIG. 1. The instrument may be placed or transported over a body of water on a suitable platform (not shown) such as a ship, aircraft, or spacecraft. Alternatively, the instrument may be transported or placed on a underwater platform. The blue laser transmitter directs a transmitter signal laser beam at a predetermined wavelength in the blue spectrum into the body of water. Typically, pulsed laser beam is used. The transmitter signal laser light is at least in-part transmitted into the body of water where it may be at least in-part reflected from underwater objects such as the floor of the body of water, rocks, animals, manmade structures, and floating objects. Such a reflection may be substantially a diffuse reflection. Some of the reflected light will form a reflected return signal delivered into the receiving aperture of the detector. The reflected return signal may be detected by the instrument's sensor (detector) and processed to infer the size, shape, depth, features, and nature of the submerged object. The detector preferably includes a notch filter that allows only the passage of a narrow band of light centered on the laser wavelength. In this manner, underwater objects can be detected and mapped. The transmitter and the detector may not necessarily be collocated. The maximum depth to which this technique is effective may depend on a number of factors including the center wavelength of the laser light, light attenuation in the body of water being surveyed, peak power of the transmitter signal beam, and the energy level of the laser pulses.

There is also a strong need for a high peak-power blue laser system for underwater communication in rivers, lakes, reservoirs, seas, and oceans. In these applications, the communication system may comprise a blue laser transmitter and a receiver, such as shown in FIG. 2 where the entire communication path is under water. Alternative communication systems are shown in FIG. 3A where the transmitter is above the water surface and the receiver is submerged, and FIG. 3B where the transmitter is submerged and the receiver is above the water surface. The submerged transmitter or receiver may be on a manned or unmanned submarine, or submerged equipment or facility, or carried by a diver. For clarity, refraction of transmitter light at the air-water interface is not indicated in FIGS. 1-3. Yet another alternative communication system may include either the transmitter or the receiver placed in space on a satellite or other space vehicle.

A suitable laser transmitter would preferably produce laser light at a wavelength in the blue spectrum in the 460-490 nanometer (nm) range, which corresponds to a favorable transmission band in water. As an example, FIG. 4 has been adapted from a publication by M. G. Solonenko and C. D. Mobley, "Inherent optical properties of Jerlov water types," Applied Optics, 54, 17, 99 5392-5401, 2015, and its shows the wavelength dependence of the minimum diffuse light attenuation coefficient $K_d$ of selected open-ocean water types. Solar irradiance spectrum has a maximum intensity near 500 nm. Therefore, solar irradiance presents a significant background noise to sensing with a blue laser, which makes a reliable detection of the return signal rather challenging. Conditions offering high signal-to-noise ratio (SNR) are very desirable for reliable detection.

Fortuitously, in the preferred 460-490-nm band, the solar output has a relative minimum near 486 nm wavelength when measured in air. This relative (local) minimum is known as the Fraunhofer "F" line. Fraunhofer lines are numerous local minimums in the solar irradiance spectrum, which are caused by absorption of solar radiation by various elements present in the Sun's corona. In particular, the Fraunhofer "F" line known to be at 486.1342 nm wavelength when measured in air (may be further referred to as "486 nm wavelength" or "486.13 nm wavelength" for brevity) is often called the hydrogen-beta or H-beta line to underscore its origins from absorption of solar radiation by hydrogen element in the Sun's corona. A close-up of the solar irradiance spectrum near the H-beta line is shown in FIG. 5, which has been adopted from a publication by F. E. Hanson et al., "Feasibility of a 486 nm Fraunhofer laser source Based on a $^4F_{3/2} \rightarrow ^4I_{9/2}$ neodymium laser," Technical Report 1480, Naval Command, Control and Ocean Surveillance Center, 1992. Note that at the bottom of the Fraunhofer line (dip), solar irradiance is about 4 to 5 times lower than in the immediate vicinity of the dip. The full width of the dip at half depth is about 0.1 nm (=1 Angstrom). This means, that a blue laser source generating a suitably narrow band signal tuned close to the center of the Fraunhofer H-beta dip may produce a return signal (FIG. 1) that will be more distinct than the corresponding solar background noise. Therefore, the return signal (FIG. 1) offers a superior SNR with respect to continuum, which, in turn allows for a more reliable detection. Alternatively, one may use an instrument with a given output to reach to greater depths of water and still obtain reliable detection. As another alternative, one may use less powerful blue laser pulses that may be generated by a smaller and lighter blue laser transmitter. In this implementation, a blue laser transmitter tuned to the Fraunhofer H-beta line may consume less electric power, require less cooling, may be less costly, and may be deployed on a smaller platform such as unmanned air vehicles (UAVs) or a small spacecraft. Such an instrument could be highly proliferated for mapping, navigation, security, defense, and environmental sensing.

It was noted earlier that the H-beta Fraunhofer line has a very narrow width of about 0.1 nm. This means that a candidate blue laser should have a correspondingly narrow bandwidth (preferably less than 0.05 nm) and a very stable central wavelength.

There are numerous techniques for producing coherent radiation from solid-state laser (SSL) materials. However, the prior art does not disclose a blue laser source capable of advantageous operation at the wavelength corresponding to the H-beta Fraunhofer line at 486 nm with a narrow laser linewidth of 0.05 nm that is also conducive to operation at high-average power and high-pulse energies, while additionally offering compact and lightweight packaging. For example, currently blue lasers with high peak-power capability deployed in remote sensing of underwater objects typically use a quasi-3 level Nd laser at 946 nm frequency-doubled to 473 nm. Attempts at a Nd-based laser suitable for frequency doubling to the H-beta Fraunhofer line at 486 nm have fallen short of expectations as indicated in the above referenced publication by Hanson.

An alternative approach using a frequency-doubled Ti:sapphire (TiS) laser leads to rather complex and inefficient hardware because it requires pumping by another laser (e.g., a frequency-doubled Nd:YLF) while the TiS gain at 972 nm needed for a second harmonic generation to the desired 486 nm wavelength is impractically low. Semiconductor laser devices such as blue laser diodes (including vertical cavity surface emitting diodes—VCSEL) fall short of the desired high output power and short pulse generation, and they do not meet the wavelength and bandwidth requirements.

Yet another alternative approach using thulium-based upconversion lasers can emit light around 480 nm, typically with tens of milliwatts of output power, but scaling of this approach to the desired average power and pulse energy has not been achieved. An optical parametric oscillator (OPO) is a still another alternative, which can be conveniently tuned to the desired 486.13 nm Fraunhofer H-beta line. However, an OPO has limited wavelength stability and bandwidth, and it must be additionally pumped by another laser, which complicates the blue laser system and limits its efficiency.

Prior art considered frequency quadrupling Tm:YAG and Tm:YLF lasers operating at about 1944 nm. Both of these lasers have high saturation energy, which requires operation at a fluence near damage threshold of optical coatings. This condition makes efficient extraction of stored energy rather challenging.

SUMMARY OF THE INVENTION

The present invention provides a blue laser transmitter generating laser light at the H-beta Fraunhofer line at the 486.13 nm wavelength measured in air. The subject blue laser comprises a thulium (Tm)-based laser source generating laser light at about 1944.537 nm wavelength when measured in air at standard conditions (may be further referred to as "1944 nm wavelength" for brevity) and a frequency quadrupling system (FQS) for harmonic conversion of the 1944 nm light into coherent light at 486.13 nm corresponding to the H-beta Fraunhofer line in air. The laser source uses a novel laser gain medium (LGM) known as $Tm:Lu_2O_3$ consisting of tri-valent thulium ions doped into lutetium sesquioxide host ($Lu_2O_3$). The lutetium sesquioxide host may be a single crystal or ceramic. An alternative LGM may be $Tm:Y_2O_3$ consisting of tri-valent thulium ions doped into yttrium sesquioxide host ($Y_2O_3$) or $Tm:Sc_2O_3$ consisting of tri-valent thulium ions doped into scandium sesquioxide host ($Sc_2O_3$).

In one preferred embodiment, the laser source may be configured as a power oscillator or as a master oscillator-power amplifier (MOPA). In either case, the laser source is arranged to produce a train of short pulses at a desirable frequency. In particular, a q-switch is employed in either the power oscillator or the master oscillator of the MOPA to generate pulses preferably about 10-30 nanoseconds long. A volume Bragg grating (VBG) mirror for reflecting light in a narrow spectral band centered at 1944.537 nm (closely corresponding to four-times the wavelength of the center of the Fraunhofer H-beta line) is used to control the bandwidth and the center wavelength of the laser source in either oscillator. In particular, the VBG has a spectral bandwidth of less than 0.3 nm full-width at half maximum (FWHM) (preferably less than 0.2 nm, and most preferably less than 0.1 nm), which is arranged to be centered at 1944.537±0.100 nm (preferably at 1944.537±0.050 nm) when measured in air at standard conditions. The effective center wavelength of the VBG may be in-part defined by fabrication and in part by temperature tuning when installed in the laser.

The operation at the 1944 nm wavelength in $Tm:Lu_2O_3$ laser gain medium (LGM) is very efficient because this wavelength resides on the shoulder of a substantially broad emission peak at about 1945 nm, FIG. 6. In addition, at the 1944 nm wavelength, $Tm:Lu_2O_3$ has only a modest saturation fluence of about 15 $J/cm^2$, which allows for efficient energy extraction at only a modest fluence (measured as a pulse energy per unit of area). In comparison to traditional materials, the $Tm:Lu_2O_3$ LGM has a saturation fluence about 2× less than Tm:YLF and about 3× less than Tm:YAG, more favorable spectroscopy, isotropy, superior thermal conductivity. In addition, the $Tm:Lu_2O_3$ LGM is now available in ceramic form, which offers making much larger-size components than by growing crystals from the melt or by using the hydrothermal process. The hydrothermal process is described for example by Colin McMillen et al., in "Hydrothermal single-crystal growth of $Lu_2O_3$ and lanthanide-doped $Lu_2O_3$," published on Aug. 11, 2011 in Cryst. Growth & Design Journal, pages, 4386-4391.

The FQS performs harmonic frequency conversion via non-linear crystals preferably in two steps. In the first step, the frequency corresponding to the fundamental wavelength of 1944 nm is doubled in a first nonlinear crystal, thus producing laser light at a first harmonic wavelength of about 972 nm. In the second step, the first harmonic wavelength of 972 nm is doubled in a second nonlinear crystal, thus producing laser light at a second harmonic at a wavelength of about 486.13 nm corresponding to center of the H-beta Fraunhofer line. The choice of the non-linear crystals for each step is selected to optimize the conversion process. The resulting frequency-quadrupled $Tm:Lu_2O_3$ laser offers a powerful blue transmitter for an increased standoff range in a very efficient, compact, lightweight, and robust package.

It is the object of the invention to provide a blue laser transmitter generating laser light at 486.13 nm wavelength when measured in air at sea level and corresponding to the H-beta Fraunhofer line.

It is another object of the invention to provide an efficient blue laser for remote detection of underwater objects and bathymetry in bodies of water including rivers, lakes, reservoirs, seas, and oceans.

It is yet another object of the invention to provide a blue laser transmitter for for mapping of underwater objects for security, defense, and environmental purposes.

It is still another object of the invention to provide a blue laser transmitter for sensing the environmental state of bodies of water including rivers, lakes, reservoirs, and oceans.

It is a further object of the invention to provide a blue laser transmitter for underwater communication.

These and other objects of the present invention will become apparent upon a reading of the following specification and claims.

DETAILED DESCRIPTION OF THE PREFERRED EMBODIMENTS

Figure 1:
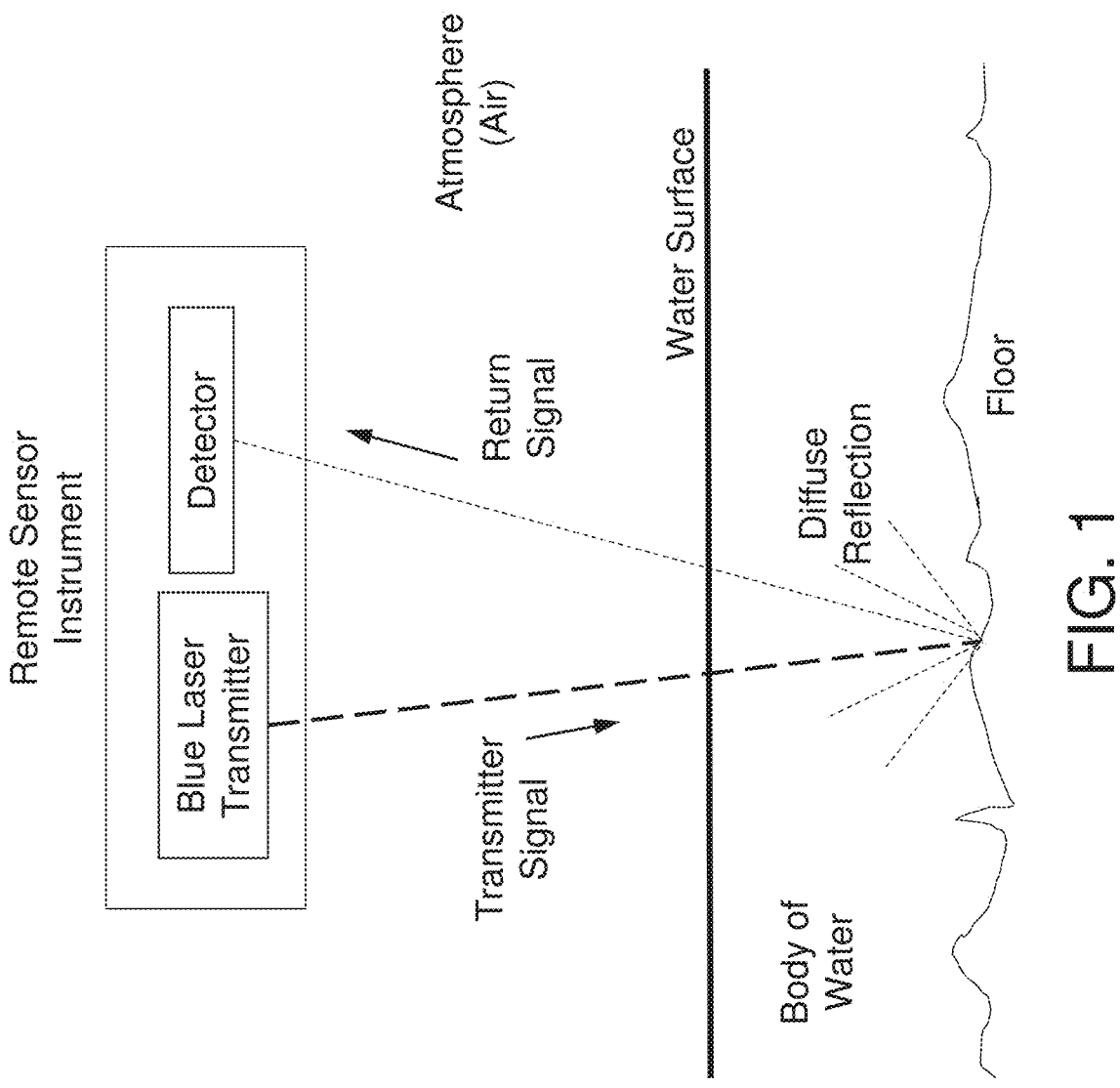
FIG. 1 is schematic diagram showing a concept for remote detection of underwater objects with a blue laser remote sensing instrument.
Figure 2:
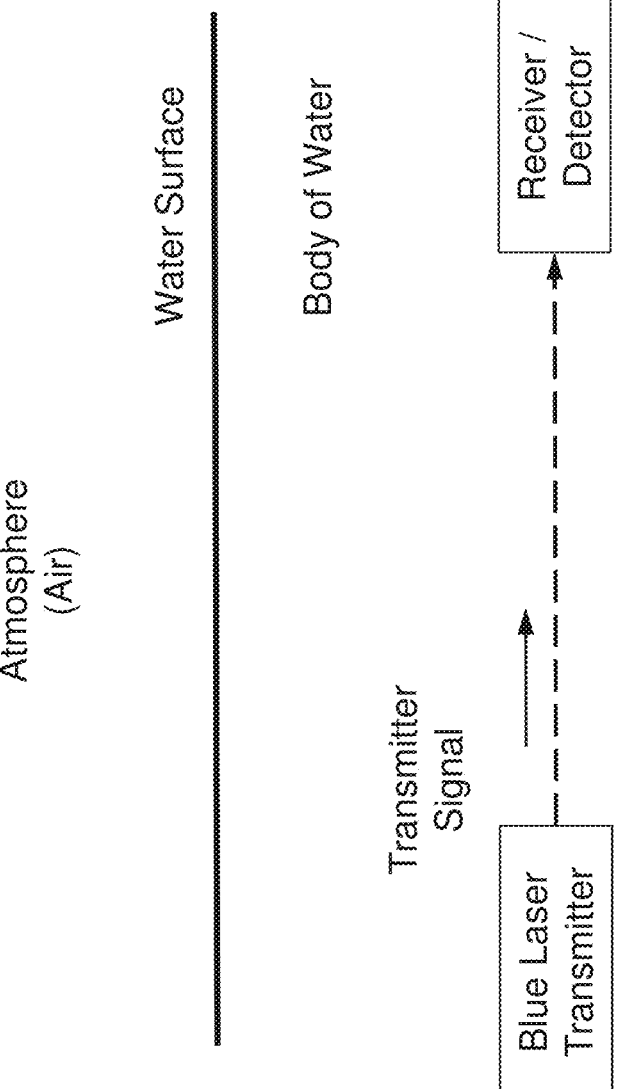
FIG. 2 is schematic diagram showing a concept for underwater communication with a blue laser transmitter.
Figures 3A, 3B:
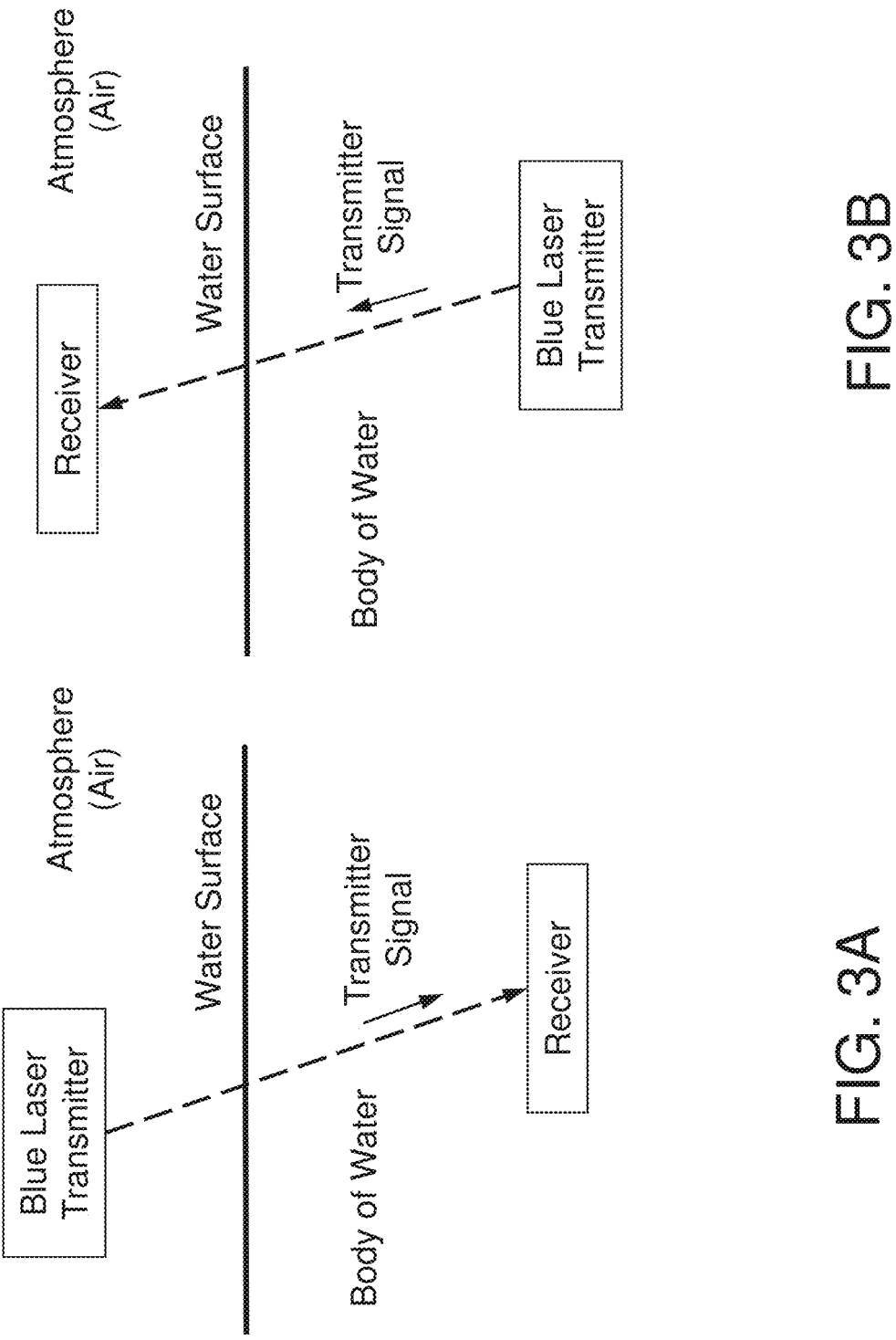
FIG. 3A is schematic diagram showing a concept for underwater communication with a blue laser transmitter where the transmitter is above the water surface and the receiver is submerged.
FIG. 3B is schematic diagram showing a concept for underwater communication with a blue laser transmitter where the receiver is above the water surface and the transmitter is submerged.
Figure 4:
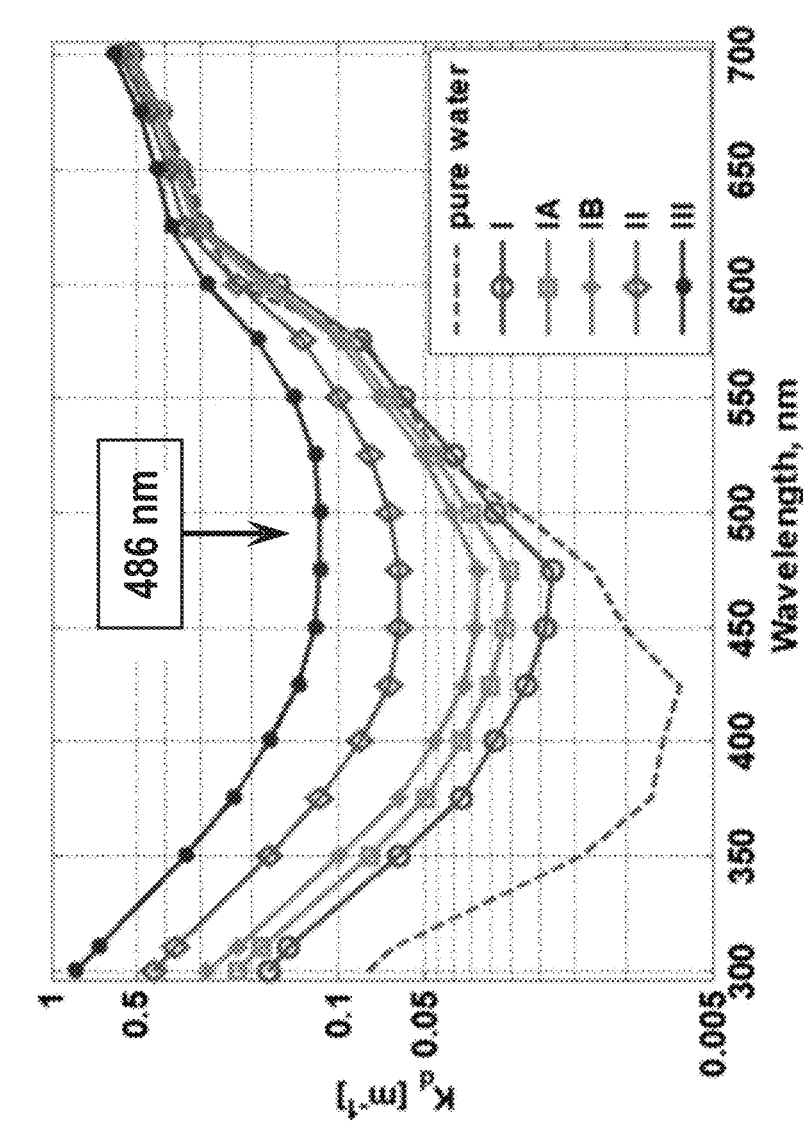
FIG. 4 is a plot of the minimum diffuse light attenuation coefficient of selected open-ocean water types that has been adapted from a publication by M. G. Solonenko and C. D. Mobley, "Inherent optical properties of Jerlov water types," Applied Optics, 54, 17, 99, pages 5392-5401, 2015.
Figure 5:
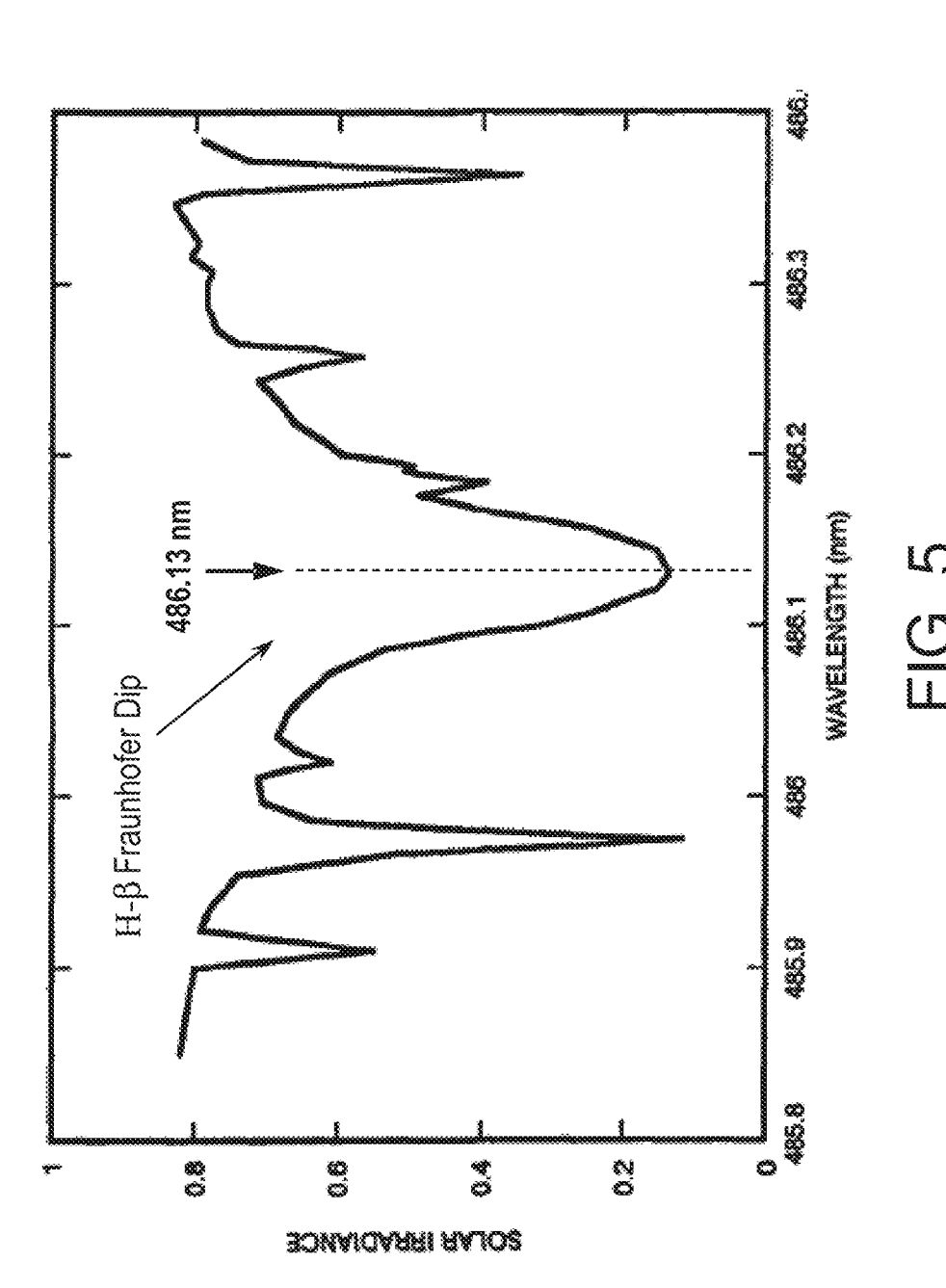
FIG. 5 is a close-up view of the solar irradiance spectrum near the H-beta line, which has been adopted from a publication by F. E. Hanson et al., "Feasibility of a 486 nm Fraunhofer laser source Based on a $^4F_{3/2} \rightarrow ^4I_{9/2}$ neodymium laser," Technical Report 1480, Naval Command, Control and Ocean Surveillance Center, 1992.
Figure 6:
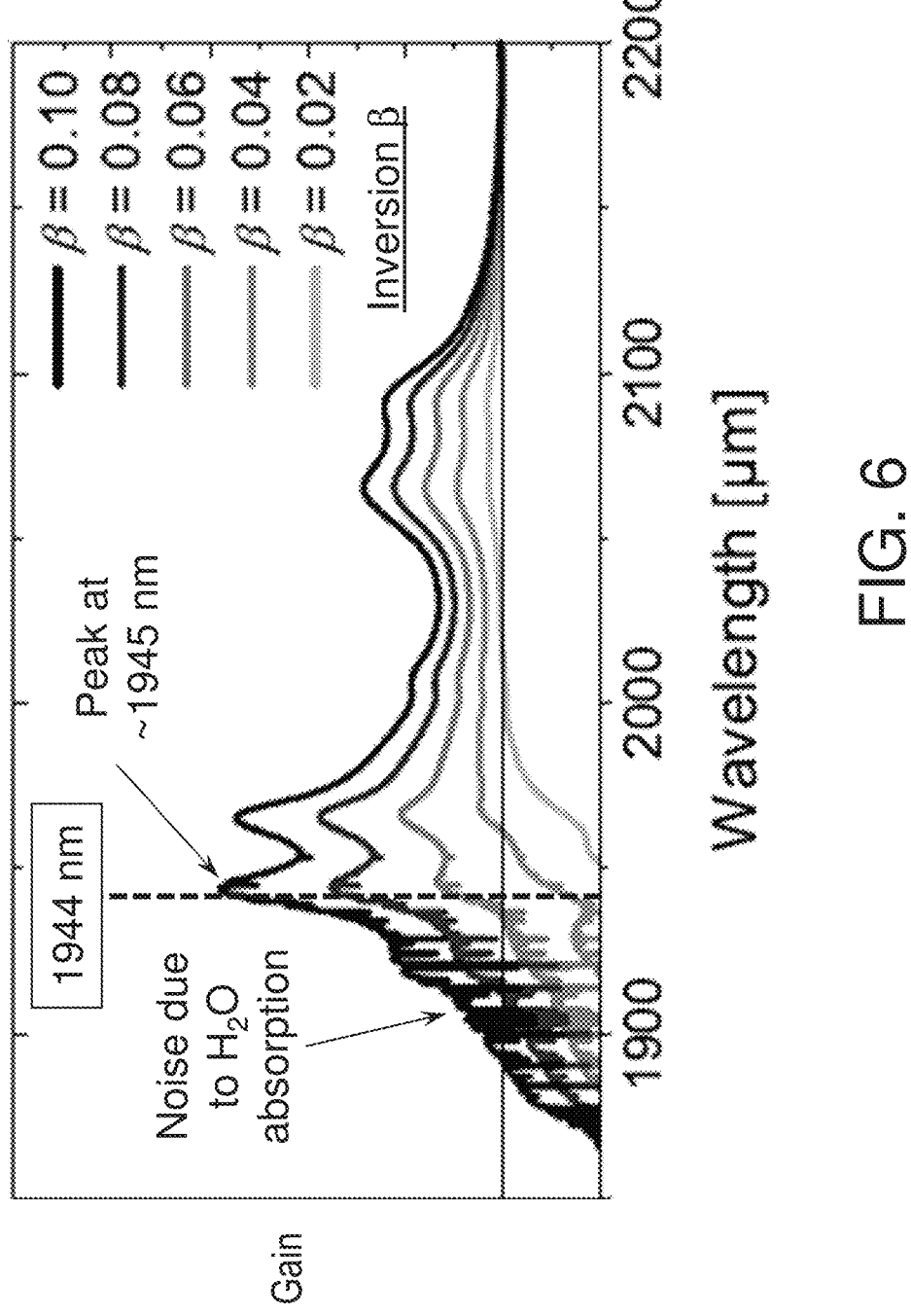
FIG. 6 is a plot of the spectral gain of Tm:Lu$_2$O$_3$ at selected levels of inversion (beta) and indicating the relative positions of the natural emission peak at 1945 nm and the targeted fundamental lasing wavelength of 1944 nm suitable for frequency quadrupling to the H-beta Fraunhofer line at 486 nm, which has been adopted from a doctoral dissertation thesis by P. Koopmann, "Thulium and Holmium-Doped Sesquioxides for 2 μm Lasers," submitted in 2012.

Selected embodiments of the present invention will now be explained with reference to drawings. In the drawings, identical components are provided with identical reference symbols in one or more of the figures. It will be apparent to those skilled in the art from this disclosure that the following descriptions of the embodiments of the present invention are merely exemplary in nature and are in no way intended to limit the invention, its application, or uses.

Figure 7:
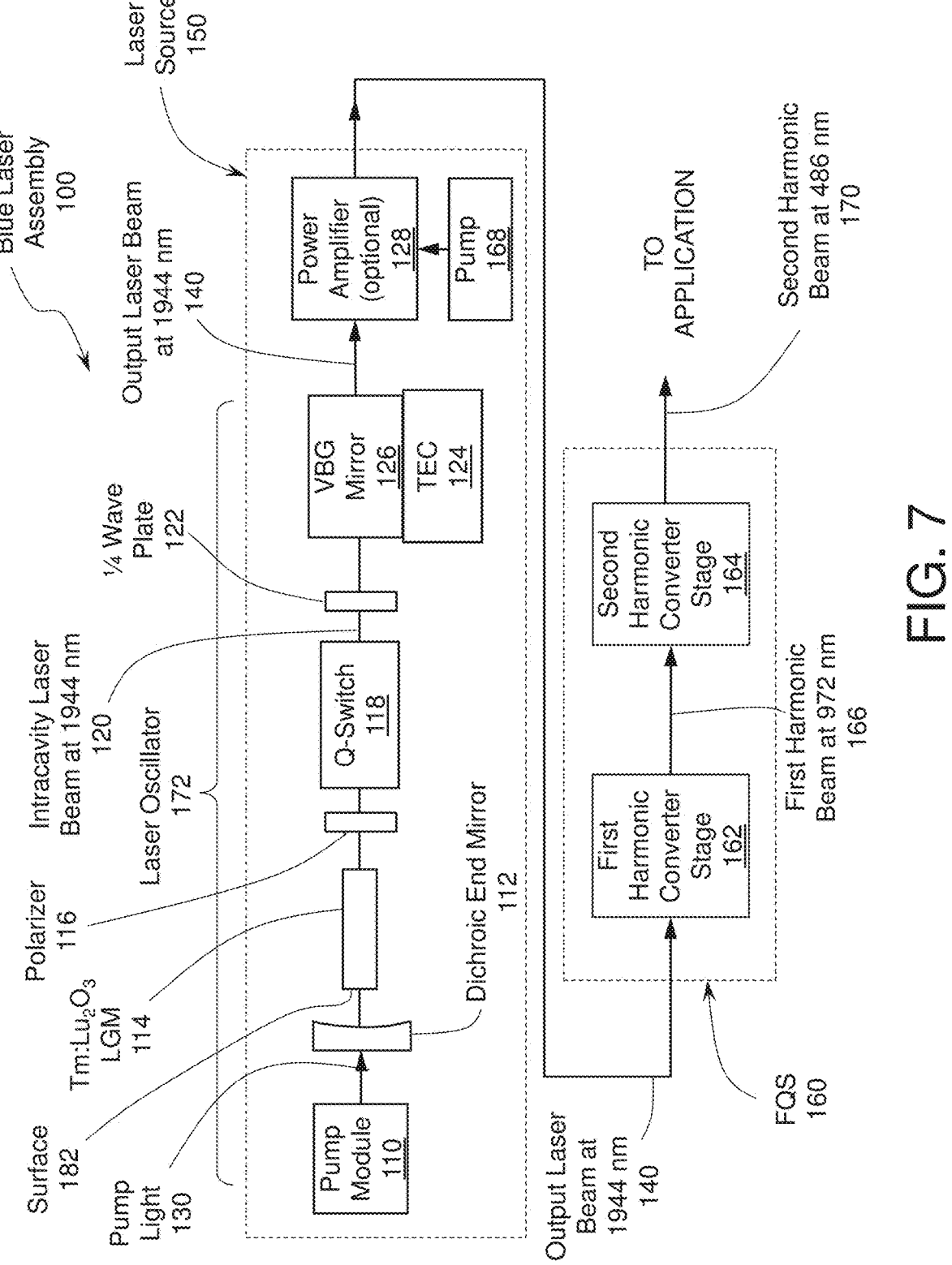
FIG. 7 is a schematic diagram showing the blue laser transmitter of the subject invention.

Referring now to FIG. 7, there is shown a blue laser assembly 100 in accordance with one preferred embodiment of the present invention. The blue laser assembly 100 comprises a laser source 150 and a frequency quadrupling system (FQS) 160. The laser source 150 further comprises a laser oscillator 172 consisting of a pump module 110, dichroic end mirror 112, Tm:Lu$_2$O$_3$ laser gain medium (LGM) 114, polarizer 116, q-switch 118, quarter wave plate 122, and volume brag grating (VBG) outcoupling mirror 126. In some variants of the subject invention, the laser source 150 may also include a power amplifier (PA) 128 that may be used to boost the energy of the output laser pulses before conveying them to the FQS 160. The dichroic end mirror 112 and the VBG mirror 126 will form a laser resonator.

The pump module 110 may be a laser diode generating pump light 130 at about 792 to 796 nm, or at about 1670 nm, or in the range of about 1600-1944 nm. As another alternative, the pump module 110 may be an erbium fiber laser Raman-shifted to deliver pump light at about 1670 nm as described by O. Antipov in "Highly efficient 2 μm CW and Q-switched Tm3+:Lu2O3 ceramic lasers in-band pumped by a Raman-shifted erbium fiber laser at 1670 nm," published in Optics Letters Vol. 41, No. 10/May 15, 2016. While this approach adds complexity, it offers improved lasing efficiency and reduced waste heat in the Tm:Lu$_2$O$_3$ LGM. As yet another alternative, the pump module 110 may be a thulium fiber laser generating a pump light in the range of about 1700-1900 nm. Improved lasing efficiency and reduced waste heat offers to offset the added complexity of this approach. The dichroic end mirror 112 is made of material with good transmission at the pump wavelength and it is coated for high reflectivity at the lasing wavelength around 1944 nm and for very low reflectivity/high transmission at the pump wavelength on the side facing the LGM 114 and for very low reflectivity/high transmission at the pump wavelength on the side facing the pump module 110. The dichroic end mirror 112 may have a convex surface on the side facing the LGM 114. The LGM 114 is made of Tm:Lu$_2$O$_3$ material, which may be in a single crystal or ceramic form. Preferred Tm doping levels are between 1 and 2% atomic. The LGM 114 may be configured as a rod, fiber, disk, thin slab, or a planar waveguide (PWG).

The q-switch 118 may be either acousto-optic, electro-optic, or a passive (saturable) light modulator. The VBG 126 is of the reflective type and it is preferably arranged to be in the range of about 30% reflective and 70% transmissive to 90% reflective and 10% transmissive at the center wavelength of 1944.537±0.100 nm (preferably 1944.537±0.050 nm) when measured in air at standard conditions. The VBG 126 preferably has a bandwidth of less than 0.3 nm full-width at half maximum (FWHM) (preferably less than 0.2 nm, and most preferably less than 0.1 nm). The VBG 126 is optionally mounted on and in good thermal communication with a TEC 124 (thermoelectric cooler). TEC devices are known to be capable of heating as well as cooling. Controlling the TEC temperature allows for precise temperature tuning of the VBG central wavelength. The PA 128 may be provided as needed to boost the energy of the output laser pulses of the oscillator 172 before conveying them to the FQS 160. The PA 128 uses its own Tm:Lu$_2$O$_3$ LGM that may be configured as a rod, fiber, planar waveguide (PWG), thin slab, or a disk. Further PA 128 may use its own pump 168.

The FQS 160 comprises a first harmonic converter stage 162 and a second harmonic converter stage 164. The first harmonic converter stage 162 uses a suitable nonlinear crystal (such as periodically-pooled lithium niobate (PPLN), potassium titanyl phosphate (KTP), and Lithium niobate (LiNbO3)) for conversion of the output beam 140 at 1944 nm wavelength into a first harmonic beam 166 at about 972 nm wavelength. The second harmonic converter stage 164 uses a suitable nonlinear crystal (such as periodically-pooled lithium niobate (PPLN), potassium niobate (KNbO3), barium borate (BBO), or lithium triborate LBO) for conversion of the first harmonic beam at about 972 nm wavelength into a second harmonic beam 170 at 486.13 nm wavelength when measured in air and closely corresponding to the center wavelength of the Fraunhofer H-beta line. Preferably the first harmonic converter stage 162 and the second harmonic converter stage 164 are arranged for efficient harmonic conversion in a single pass through their respective non-linear crystals, thus offering a simple layout. This is possible by providing the beam 140 with pulse energy, pulse length, and beam size to attain beam intensities at which single pass through the non-linear crystals converts much of the pulse energy into a harmonic.

In operation, the pump module 110 generates pump light 130 and injects it through the dichroic end mirror 112 into the LGM 114 where it is largely absorbed. Absorbed pump light pumps Tm ions into the upper laser level according to a known process. With the q-switch 118 being closed shut, there is absence of a suitable optical feedback, thus, laser energy may be momentarily stored in the LGM. At predetermined times, the q-switch 118 is arranged to open and pass therethrough 1944 nm light. This, in turn, allows the VBG 126 to receive optical radiation from the LGM 114 and reflect some of it back, thus providing optical feedback to the LGM. As a result, laser oscillations commence, and the energy stored in the LGM 114 is transferred into the intracavity beam 120. The intracavity oscillations may last for a few nanoseconds to about 100 nanoseconds (preferably 10 to 30 nanoseconds), which may significantly depend on the configuration of the laser resonator, especially the physical separation of the dichroic mirror 112 and the VBG outcoupling mirror 126. A portion of the intracavity beam 120 passes through the VBG 126 and forms the output laser beam 140. The output laser pulse may be on the order of a few nanoseconds to about 100 nanoseconds long but preferably it is 10 to 30 nanoseconds long. If necessary, the pulse energy of the output laser beam 140 may be further boosted in the PA 128 before being injected into the FQS 160. Pulsing of the laser may be repeated at suitable repetition rate. Typical pulse repetition rate may be as low as a single pulse, or few Hz, or as high as hundreds of kilohertz range.

In the FQS 160, the laser beam 140 at 1944 nm wavelength is fed into the first harmonic converter stage 162 and substantially converted to a first harmonic beam 166 at 972 nm wavelength in a single pass through the non-linear crystal. The unconverted portion of the fundamental beam at 1944 nm wavelength may be removed by a dichroic beam splitter (not shown). The first harmonic beam 166 at 972 nm wavelength is now fed to the second harmonic converter stage 164 and substantially converted to a second harmonic beam 170 at 486 nm wavelength in a single pass through the non-linear crystal which. The resulting second harmonic beam 170 may be provided to an application. The unconverted portion of the first harmonic beam at 972 nm wavelength may be removed by a dichroic beam splitter (not shown).

In some variants of the invention, the dichroic mirror may be omitted and the surface 182 of the LGM 114 facing the pump module 110 may be coated with a dichroic coating for high reflectivity at the lasing wavelength around 1944 nm and for very low reflectivity/high transmission at the pump wavelength.

Figure 8:
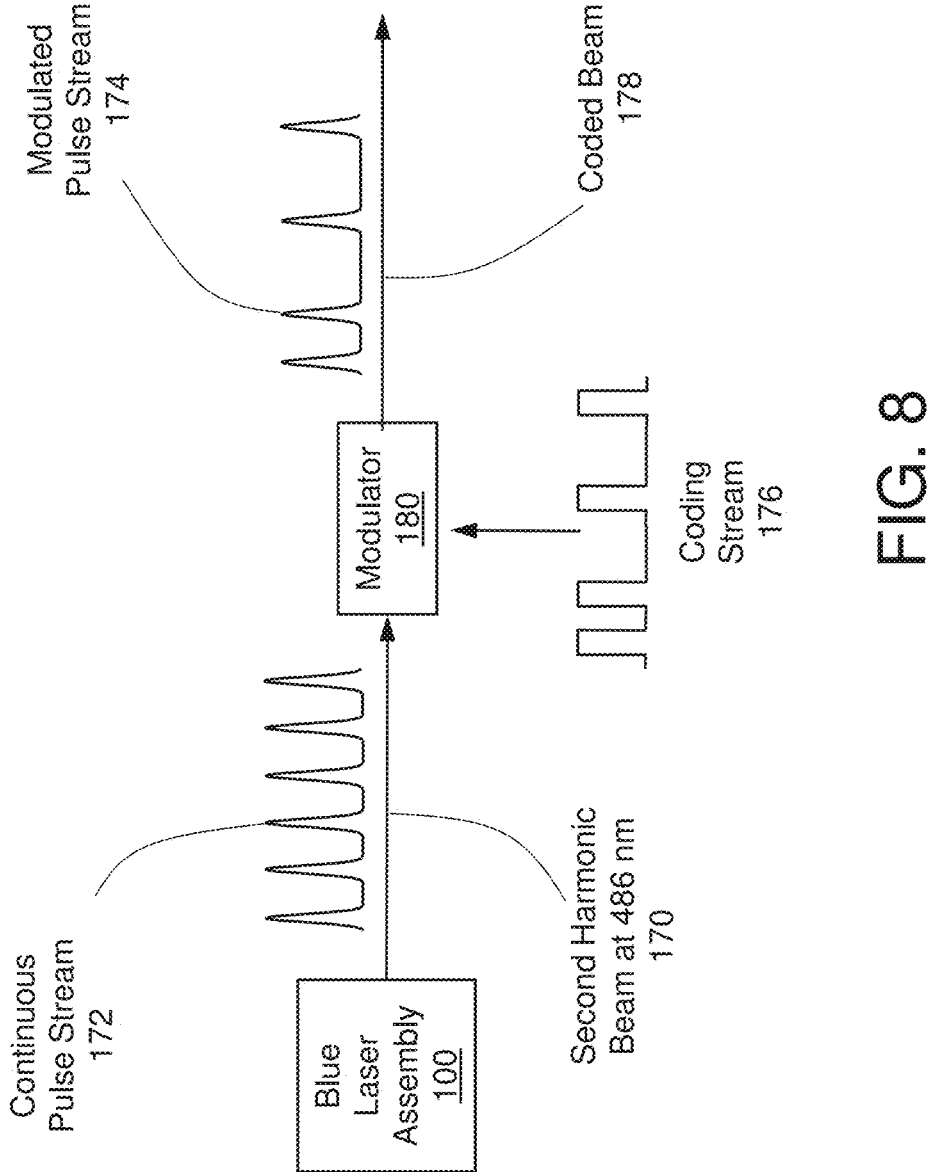
FIG. 8 is a schematic diagram showing the blue laser transmitter of the subject invention used with a modulator suitable for communication.

Referring now to FIG. 8 there is shown a blue laser assembly 100 operating with a modulator 180 as a part of a transmitter that may be used for communication of information. In particular, the blue laser assembly 100 generates a second harmonic beam 170 at 486.13 nm wavelength comprising a continuous pulse stream 172, which are directed into the modulator 180. The modulator 180 is provided with a coding stream 176 and it accordingly modulates the beam 170 with the continuous pulse stream 172 into a coded beam 178 having a modulated pulse stream 174.

Another preferred embodiment of the present invention may use $Tm:Y_2O_3$ LGM in lieu of the $Tm:Lu_2O_3$. While $Tm:Y_2O_3$ is deemed to have a lower gain at 1944 nm than $Tm:Lu_2O_3$, it offers lower cost due to the higher abundance of the yttrium element (Y).

Yet another preferred embodiment of the present invention may use $Tm:Sc_2O_3$ LGM in lieu of the $Tm:Lu_2O_3$. $Tm:Sc_2O_3$ is deemed to have a lower gain at 1944 nm than $Tm:Lu_2O_3$.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

The term "suitable," as used herein, means having characteristics that are sufficient to produce a desired result. Suitability for the intended purpose can be determined by one of ordinary skill in the art using only routine experimentation.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

The terms "Fraunhofer F line", "Fraunhofer H-beta line", "H-beta Fraunhofer line", and "H-beta Fraunhofer dip" refer to the dip in solar radiation spectrum with its center known to be at 486.1342 nm wavelength when measured in air.

The terms "486 nm wavelength" and "486.13 nm wavelength" refer to the center wavelength of the Fraunhofer H-beta line. The terms "1944 nm wavelength" and "1944 nm wavelength" refer to the 1944.537 nm wavelength measured in air at standard condition, which is about four times the wavelength of the Fraunhofer H-beta line.

The term "standard conditions" means air at 100 kilopascals pressure, 20 degrees Celsius temperature, 50% relative humidity, and carbon dioxide content of 450 parts per million.

Different aspects of the invention may be combined in any suitable way.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A blue laser system comprising a laser source and a frequency quadrupling system (FQS);

a) said laser source being a laser oscillator, b) said laser oscillator including a pump module, a dichroic mirror, a laser gain material, a polarizer, a q-switch, one-quarter wave plate and a Volume Bragg Grating (VBG);

c) said laser gain element selected from the family consisting of Tm:Lu2O3, Tm:Y2O3, and Tm:Sc2O3;

d) said VBG being arranged to restrict lasing in said laser oscillator to a wavelength of 1944.537±0.100 nm measured in air at standard conditions; and e) said FQS comprising a non-linear crystal wherein laser light resulting from said lasing at said 1944.537±0.100 nm arranged to be converted in said FQS to a wavelength in the vicinity of about 486.13 nm measured in air at sea level and corresponding to the vicinity of the H-beta Fraunhofer line.

2. The blue laser system of claim 1, wherein said laser gain material is in a ceramic form.

3. The blue laser system of claim 1, wherein said laser source further includes a power amplifier and a pump.

4. The blue laser system of claim 1, further including a TEC in thermal contact with said VBG.

5. The blue laser system of claim 4, wherein the temperature of said TEC is adjusted so that the center wavelength of said laser light wavelength in the vicinity of 486.13 nm is arranged to be within 0.025 nm of the Fraunhofer H-beta line center at 486.13 nm wavelength measured in air at sea level.

6. The blue laser system of claim 1, wherein said pump module is for generation of pump light; said pump module is selected from the family consisting of laser diode, thulium fiber laser, and Raman-shifted erbium laser.

7. The blue laser system of claim 6, wherein said pump light is of wavelengths selected from the family consisting of about 796 nm, 1670 nm, and 1700-1900 nm.

8. The blue laser system of claim 1, wherein said Volume Bragg Grating is arranged to restrict said lasing to the wavelength band of <0.2 nm.

9. The blue laser system of claim 1, wherein said laser oscillator is operated with the q-switch to generate a train of 10-30 nanosecond pulses.

10. The blue laser system of claim 1, wherein said FQS comprises a first harmonic converter to frequency double said output at said 1944 nm wavelength to about 972 nm wavelength in a single pass through said first harmonic converter stage.

11. The blue laser system of claim 1, wherein said FQS comprises a second harmonic converter stage to frequency double a 972 nm wavelength to about a 486 nm wavelength in a single pass through said second harmonic converter stage.

12. The blue laser system of claim 1, where the blue laser system further comprises a modulator wherein the modulator is provided with a continuous pulse stream and a coding stream and outputs a coded beam having modulated pulse stream.

13. A blue laser system comprising a laser source and a frequency quadrupling system (FQS);

a) Said laser source being a laser oscillator including a pump module, a dichroic mirror, a laser gain material, a polarizer, a q-switch, a one-quarter wave plate, and a Volume Bragg Grating (VBG), and means for temperature control of said VBG;

b) said laser source being arranged such that said laser oscillator delivers an output laser beam;

c) said laser gain element selected from the family consisting of Tm:Lu2O3, Tm:Y2O3, and Tm:Sc2O3;

d) said VBG being arranged to restrict said output laser beam of said laser oscillator to a wavelength band of 1944.537±0.100 nm measured in air at standard conditions; and e) said FQS comprising a first harmonic converter stage and a second harmonic converter stage wherein laser light resulting from said lasing at said 1944.537±0.100 nm arranged to be converted in said FQS to a wavelength of about 486.13 nm measured in air at sea level and corresponding to the vicinity of the H-beta Fraunhofer line.

14. The blue laser system of claim 13 wherein the laser source further comprises a TBC in thermal contact with said VBG, a power amplifier and a pump.

15. A method of generating coherent laser radiation of a wavelength centered at 486.13 nm corresponding to the Fraunhofer H-beta line comprising the steps of a) Operating a laser source including a pump module, a Tm:Lu2O3 laser gain material; (LGM), a q-switch, a Volume Bragg Grating (VBG);

b) Temperature tuning the center wavelength of said VBG to four times the wavelength of said Fraunhofer H-beta line;

c) Closing the g-switch shut;

d) Pumping said LGM by said pump module;

e) Storing laser energy in said LGM;

f) Opening said q-switch;

g) Extracting laser power at 1944 nm wavelength from said LGM through said VBG;

h) Converting a portion of said laser power at 1944 nm wavelength to a first harmonic at 972 nm wavelength in a first harmonic converter stage;

i) Converting said first harmonic at 972 nm wavelength to a second harmonic at 486 nm wavelength in a second harmonic converter stage; and j) Closing said q-switch shut.

* * * * *